(12) United States Patent
Lakic

(10) Patent No.: US 8,418,890 B2
(45) Date of Patent: Apr. 16, 2013

(54) PORTION CONTROL DISPENSERS

(75) Inventor: Blago Lakic, Vancouver (CA)

(73) Assignee: FundaMetal Designs Inc., Burnaby (CA)

( * ) Notice: Subject to any disclaimer, the term of this patent is extended or adjusted under 35 U.S.C. 154(b) by 718 days.

(21) Appl. No.: 12/576,560

(22) Filed: Oct. 9, 2009

(65) Prior Publication Data

US 2010/0089953 A1    Apr. 15, 2010

Related U.S. Application Data

(60) Provisional application No. 61/104,257, filed on Oct. 9, 2008.

(51) Int. Cl.
*G01F 11/00*    (2006.01)

(52) U.S. Cl.
USPC ........... 222/309; 222/323; 222/324; 222/341; 222/390; 222/485; 222/491; 222/506

(58) Field of Classification Search .......... 222/323–324, 222/390–391, 326, 386, 565, 505, 506, 491, 222/485, 340, 341, 308–309

See application file for complete search history.

(56) References Cited

U.S. PATENT DOCUMENTS

| 2,104,990 | A | * | 1/1938 | Hoefler | 222/309 |
|---|---|---|---|---|---|
| 2,443,022 | A | * | 6/1948 | Berg | 222/387 |
| 2,892,286 | A | * | 6/1959 | Martin | 406/26 |
| 3,390,814 | A | * | 7/1968 | Creighton, Jr. et al. | 222/137 |
| 3,774,816 | A | * | 11/1973 | Bratton | 222/391 |
| 5,323,934 | A | * | 6/1994 | Isert | 222/326 |
| 6,230,940 | B1 | | 5/2001 | Manning et al. | |
| 6,951,295 | B1 | | 10/2005 | Gaus et al. | |

* cited by examiner

*Primary Examiner* — Frederick C Nicolas

(74) *Attorney, Agent, or Firm* — Oyen Wiggs Green & Mutala LLP

(57) ABSTRACT

A dispenser for dispensing portions of flowable materials has a piston that is advanced along a dispensing chamber by rotation of a spindle that passes through the piston. A stop may limit travel of the piston to control the volume of flowable material dispensed. The stop may be adjustable. In an example hand-held dispenser the spindle is rotated by a rack and pinion mechanism that can be operated with one hand. The dispenser may be used, for example, for dispensing portions of condiments, sauces or the like.

20 Claims, 12 Drawing Sheets

US 8,418,890 B2

PORTION CONTROL DISPENSERS

CROSS-REFERENCE TO RELATED APPLICATION

This application claims the benefit under 35 U.S.C. §119 of U.S. patent application 61/104,257 filed 9 Oct. 2008 and entitled PORTION CONTROL DISPENSER, which is hereby incorporated herein by reference in its entirety for all purposes.

TECHNICAL FIELD

This invention relates to dispensers for flowable products. Some embodiments provide dispensers for food products such as ketchup, mustard, mayonnaise and the like.

BACKGROUND

In many fields there is a need to dispense portions of flowable products. One example is the food industry where products such as condiments, sauces and the like need to be dispensed. There is a particular need for such dispensers that are capable of repeatably dispensing identical portions of a flowable product.

There is a need for practical and cost effective portion control dispensing devices.

SUMMARY

This invention has a number of aspects. Without limitation, these aspects include the following.

One aspect provides dispensers for dispensing flowable materials that comprise a reservoir in fluid communication with a dispensing chamber; a piston movably fitted in the dispensing chamber; at least one outlet port in the dispensing chamber; and a mechanism for advancing the piston along the dispensing chamber. The mechanism comprises a spindle that extends through an opening in the piston. The spindle is rotatable to advance the piston along the dispensing chamber. In some embodiments, rotation of the spindle is driven by a linkage comprising a rack that engages a pinion coupled to drive rotation of the spindle. The rack may be connected to an operating handle.

Another aspect provides dispenser mechanism for dispensing portions of a flowable material from a reservoir. The dispenser mechanisms comprise a body containing a dispensing chamber; a piston movably fitted in the dispensing chamber; at least one outlet port in the dispensing chamber; and a mechanism for advancing the piston along the dispensing chamber. The mechanism comprises a spindle extending through an opening in the piston. The spindle has helical features engaged with features on the piston. A linkage couples an operating handle to the spindle. The spindle is rotatable to advance the piston along the dispensing chamber in response to movement of the operating handle.

Another aspect provides dispenser mechanisms for dispensing portions of a flowable material from a reservoir. The dispenser mechanisms comprise: a body containing a dispensing chamber; a piston movably fitted in the dispensing chamber; at least one outlet port in the dispensing chamber; a spindle extending through an opening in the piston, and, means for rotating the spindle to advance the piston along the dispensing chamber. The spindle has helical features engaged with features on the piston.

Another aspect comprises methods for dispensing measured portions of a flowable material. The methods comprise introducing the flowable material into a dispensing chamber and advancing a piston along the dispensing chamber to dispense the flowable material through at least one opening. Advancing the piston comprises rotating a spindle having helical features that engage the piston. In certain embodiments, the spindle is rotated by squeezing an operating handle.

Further aspects of the invention and features of example embodiments of the invention are described below and/or depicted in the accompanying drawings.

BRIEF DESCRIPTION OF THE DRAWINGS

Example, non-limiting embodiments are illustrated in the accompanying drawings. The embodiments and figures disclosed herein are to be considered illustrative rather than restrictive.

Figure 1:
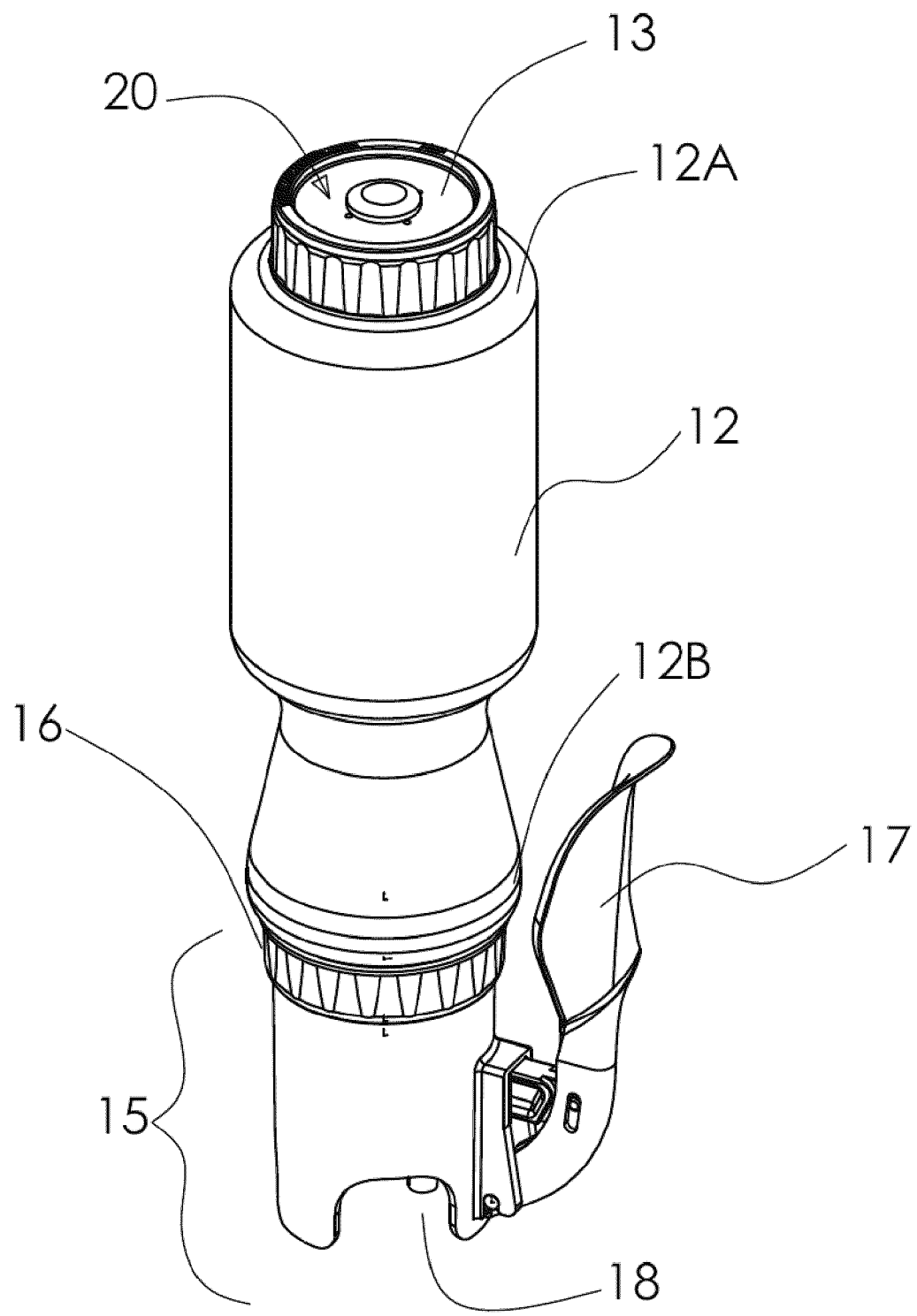
FIG. 1 is a perspective view of a portion control dispenser according to an example embodiment of the invention.

LIST OF REFERENCE NUMBERS 10 portion control dispenser
12 container body
12A, 12B ends of body
13 cap
15 dispenser mechanism
16 fitting
17 handle
18 opening
20 vent
21 vent member
22 piston
23 dispensing chamber
24 member
25 teeth
26A rack
26B pinion
27 spindle
28 helical threads
30 spacer
31 spring
32 spring
34 port 37 blades
39 rib
40 notch
41 bore of piston
42 helical threads
44 valve member
45 opening
49 orientation mark
50 cavity

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

FIG. 1 shows a portion control dispenser 10 having a container body 12 capable of containing a product to be dispensed. The interior or container body 12 provides a reservoir for the product to be dispensed. In example applications, container body 12 may contain a flowable food product such as mustard, mayonnaise, ketchup, or the like. A portion control dispenser having features like those of dispenser 10 may also be used to dispense dry granular materials like sugar or powdered spices or the like. Dispenser 10 is not limited to use in dispensing food products. In the illustrated embodiment, container body 12 is tubular and has openings on each of its ends 12A and 12B. A cap 13 is provided on end 12A. Cap 13 may be removed to refill dispenser 10. Cap 13 may, for example, be threaded onto or snapped onto end 12A.

A dispenser mechanism 15 is attached at end 12B of container body 12. In the illustrated embodiment dispenser mechanism 15 comprises a body having a fitting 16 which detachably couples to container body 12. Fitting 16 may, for example, comprise threads that engage corresponding threads on end 12B of container body 12.

Dispenser mechanism 15 is operated by a handle 17. When handle 17 is squeezed toward dispenser mechanism 15, a measured amount of material from container body 12 is dispensed by way of an opening 18. In the illustrated embodiment a lower edge of a housing of dispenser mechanism 15 is contoured to provide feet on which dispenser 10 can stand when it is not being used.

Figure 1A:
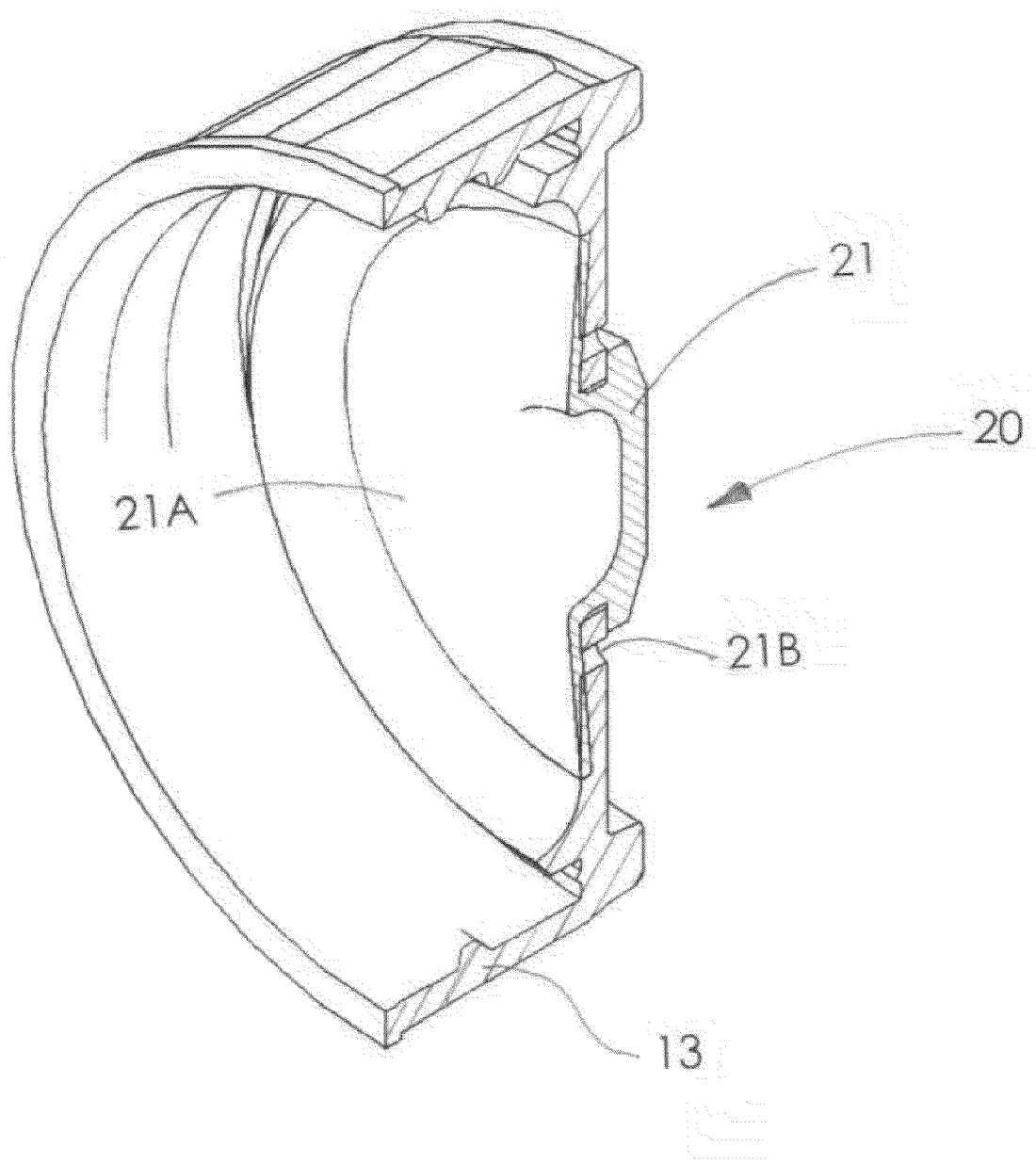
FIG. 1A is a perspective sectioned view of a cap of the portion control dispenser.
Figure 2:
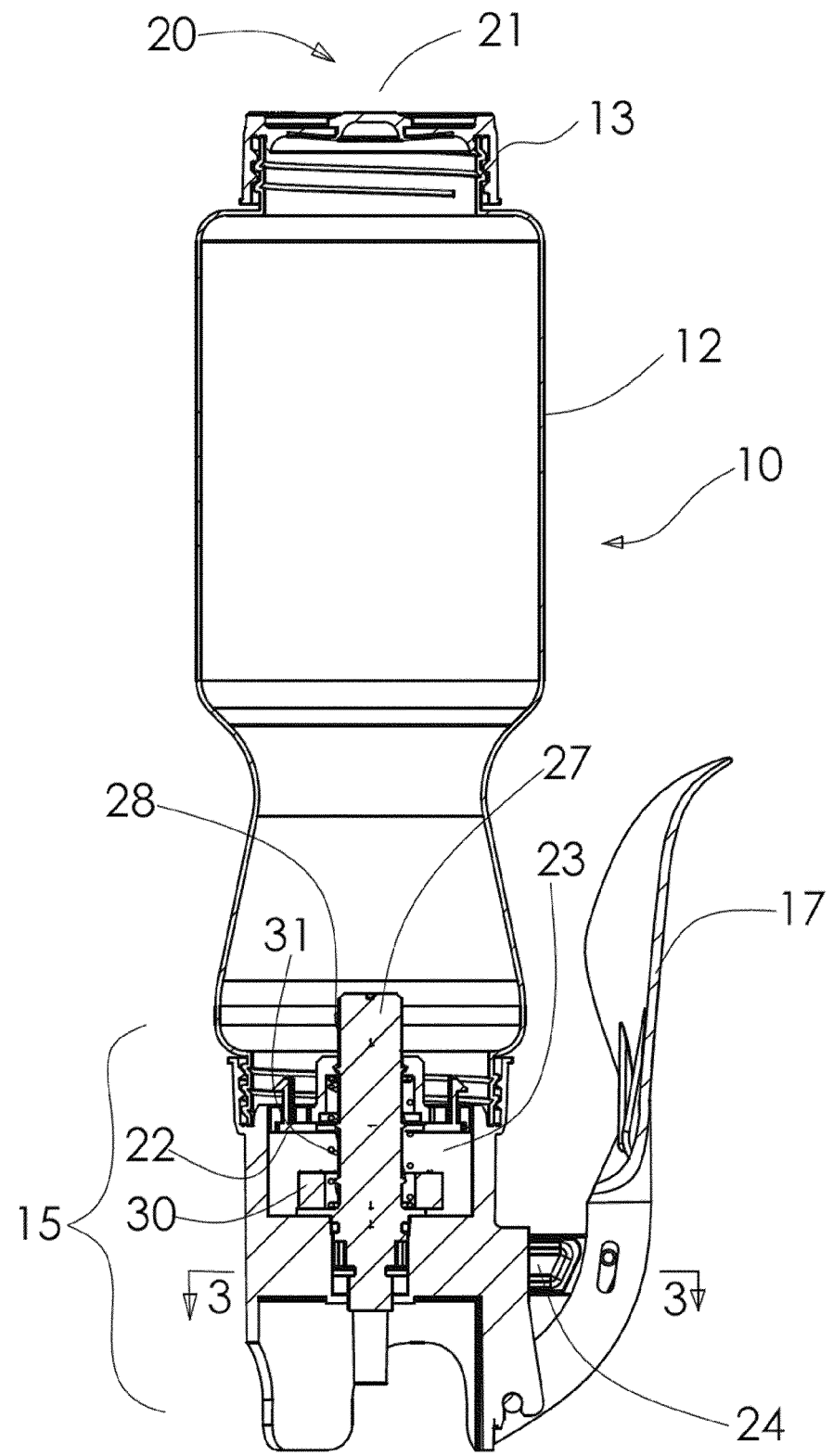
FIG. 2 is an elevational cross-section through the portion control dispenser.

A vent 20 is provided in cap 13 to allow air to flow into container body 12 to replace material that has been dispensed from dispenser 10. FIG. 1A is a cross-section through a cap 13 showing details of construction of an example vent 20. In this view it can be seen that member 21 has an enlarged head 21A that slides toward and blocks openings 21B through cap 13 if dispenser 10 is inverted. Member 21 may be made of a flexible elastomeric type of material such as silicone rubber or the like, for example. As shown in FIG. 2, vent 20 may comprise an element 21 captured in an aperture in cap 13. Element 21 allows air to flow into container body 12 but, if dispenser 10 is inverted, element 21 prevents material from leaking excessively from the interior of container body 12 by way of vent 20.

Figure 3:
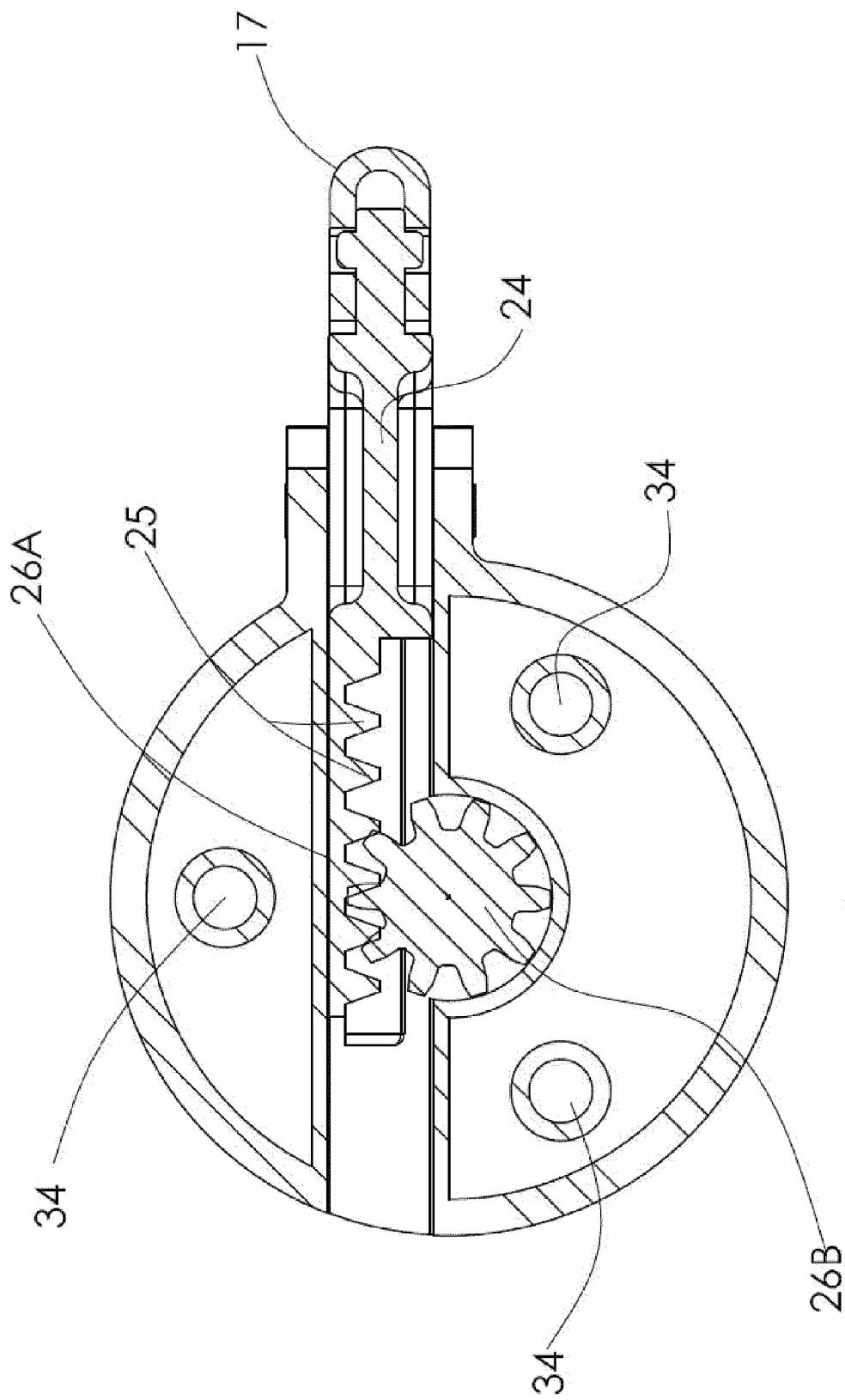
FIG. 3 is a cross-section in the plane 3-3 of FIG. 2 through a dispensing mechanism of the portion control dispenser.

As shown in FIGS. 2 and 3, material from within container body 12 can descend to fill dispensing chamber 23. A movable piston 22 sweeps through dispensing chamber 23 when handle 17 is operated to expel material from dispenser 10. The volume of material dispensed is determined by the stroke of piston 22.

In the illustrated embodiment, handle 17 is coupled to a member 24 which moves horizontally (as depicted in the Figures) upon operation of handle 17. Member 24 has teeth 25 on one end thereof which form a rack 26A. Rack 26A engages a pinion 26B which turns when handle 17 is operated. Pinion 26B is connected to turn a spindle 27 upon which piston 22 is mounted. Spindle 27 has helical threads which engage mating threads in a bore of piston 22. Thus, in operation, when handle 17 is squeezed, spindle 27 rotates in a direction such that piston 22 is moved down toward opening 18.

A spacer 30 or other stop limits the travel of piston 22. The amount of material dispensed for each pull of handle 17 may be adjusted by replacing spacer 30 with an alternative spacer having a different thickness. The amount of material to be dispensed may be reduced by making spacer 30 thicker or by adding additional spacers on top of spacer 30. Conversely, the amount of material dispensed with each pull of handle 17 may be increased by making spacer 30 thinner or by removing spacer 30. Alternative fixed or adjustable stops which limit the travel of piston 22 may be provided in place of spacer 30.

A spring 31 biases piston 22 toward its raised position. After handle 17 has been squeezed, when handle 17 is released, spring 31 pushes piston 22 back upwardly. In doing so, spindle 27 is caused to rotate in such a way that handle 17 is returned to its original position. An additional spring 32 (see FIGS. 6, 7A and 7B) may also be provided to help to return operating handle 17 to its original position.

Material moves from dispensing chamber 23 to opening 18 by way of ports 34 (see FIG. 3). In the illustrated embodiment, blades 37 are mounted on spindle 27. Blades 37 are located such that they block ports 34 when handle 17 is in its released position. When handle 17 is squeezed to rotate spindle 27 then blades 37 are carried away from ports 34 so that the material within dispensing chamber 23 can flow out through ports 34. When handle 17 is released then spindle 27 rotates back to its original position such that blades 37 cover ports 34 as shown in dotted outline in FIG. 4.

Figure 4:
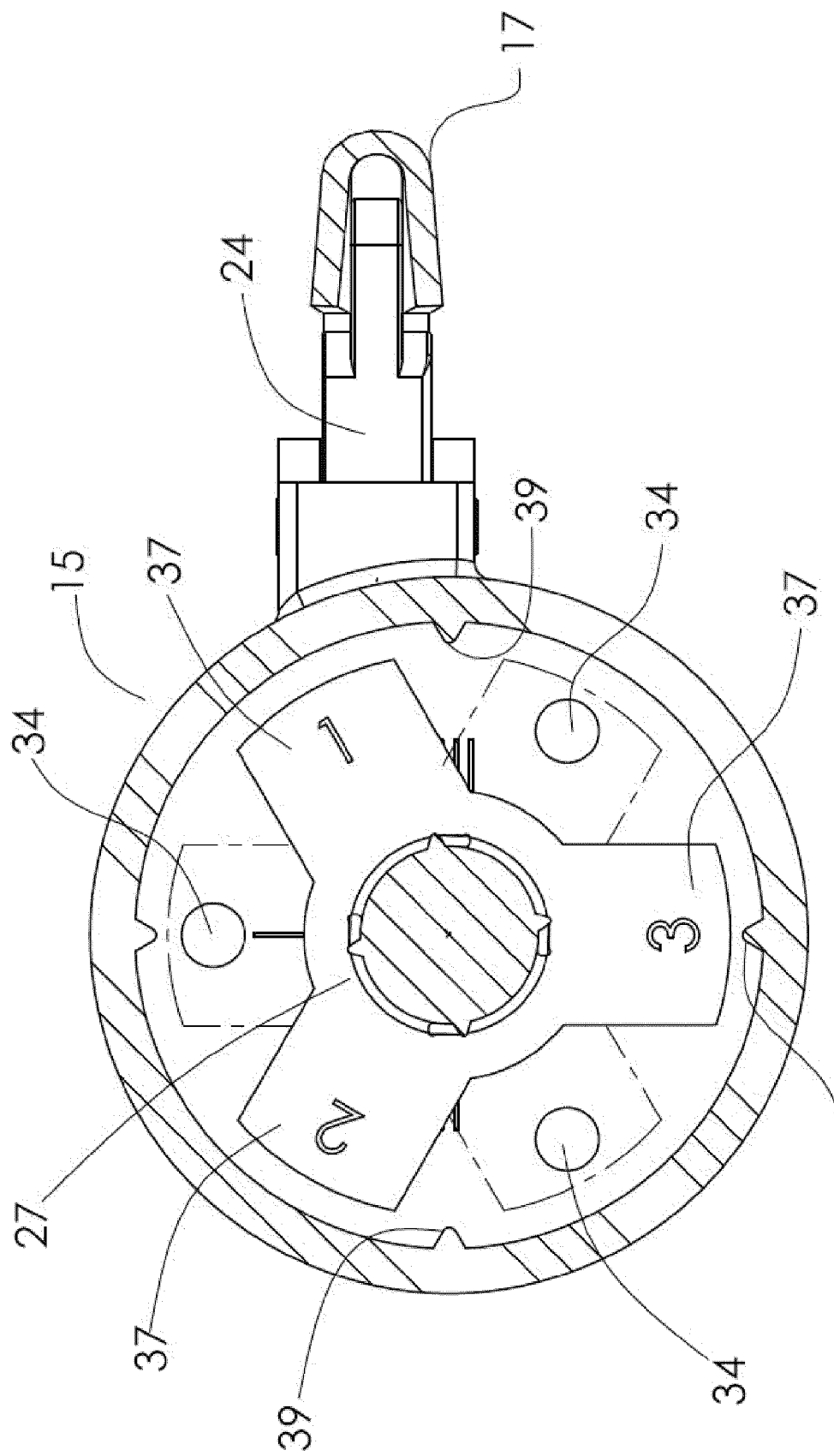
FIG. 4 is a sectional view looking down into the dispensing mechanism of the portion control dispenser.
Figure 5:
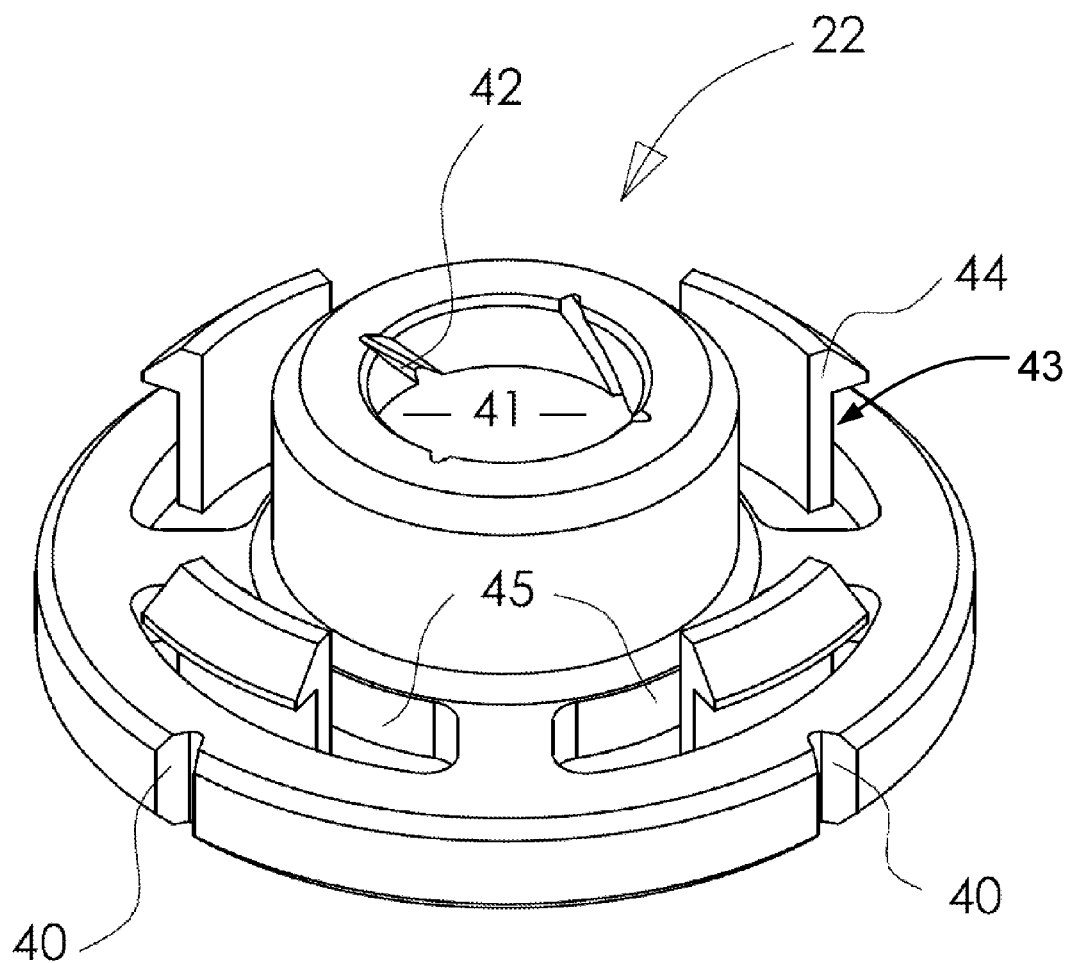
FIG. 5 is an enlarged perspective view showing a piston of the portion control dispenser.

Also as shown in FIG. 4, piston 22 is prevented from rotating by means of ribs 39 which project inwardly into dispensing chamber 23. FIG. 5 shows piston 22. In FIG. 5 can be seen notches 40 which engage ribs 39 when piston 22 is in place. Notches 40 prevent piston 22 from rotating as it slides down to push material out of dispensing chamber 23 and then returns to its original position. FIG. 5 also shows helical threads 42 in a bore 41 of piston 22. Helical threads 42 engage corresponding helical threads on spindle 27.

In the illustrated embodiment material from container body 12 can flow into dispensing chamber 23 by way of a one-way valve 43. In the illustrated embodiment, one-way valve 43 is carried on piston 22. In the illustrated embodiment, one way valve 43 is provided by a floating member 44 engageable in openings 45 which pass through piston 22. When piston 22 is static then member 44 hangs downward under the force of gravity. Material can then flow through openings 45 and around member 44 into dispensing chamber 23. When piston 22 is being forced downwardly during operation of dispensing mechanism 15 then member 44 is displaced upwardly and prevents the material from exiting dispensing chamber 23 by way of openings 45.

Figure 4A:
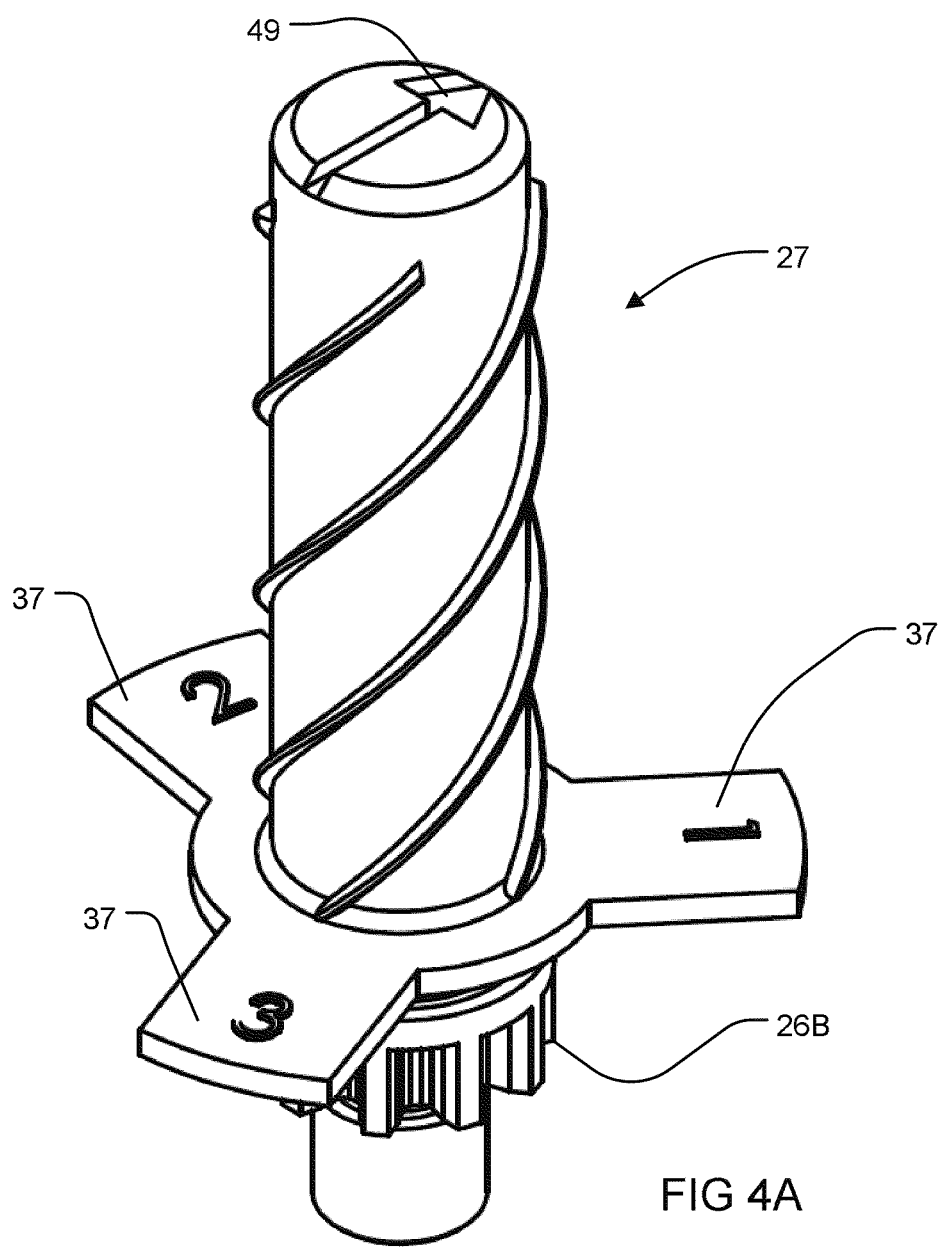
FIG. 4A is a perspective view showing a spindle assembly of the portion control dispenser.
Figure 6:
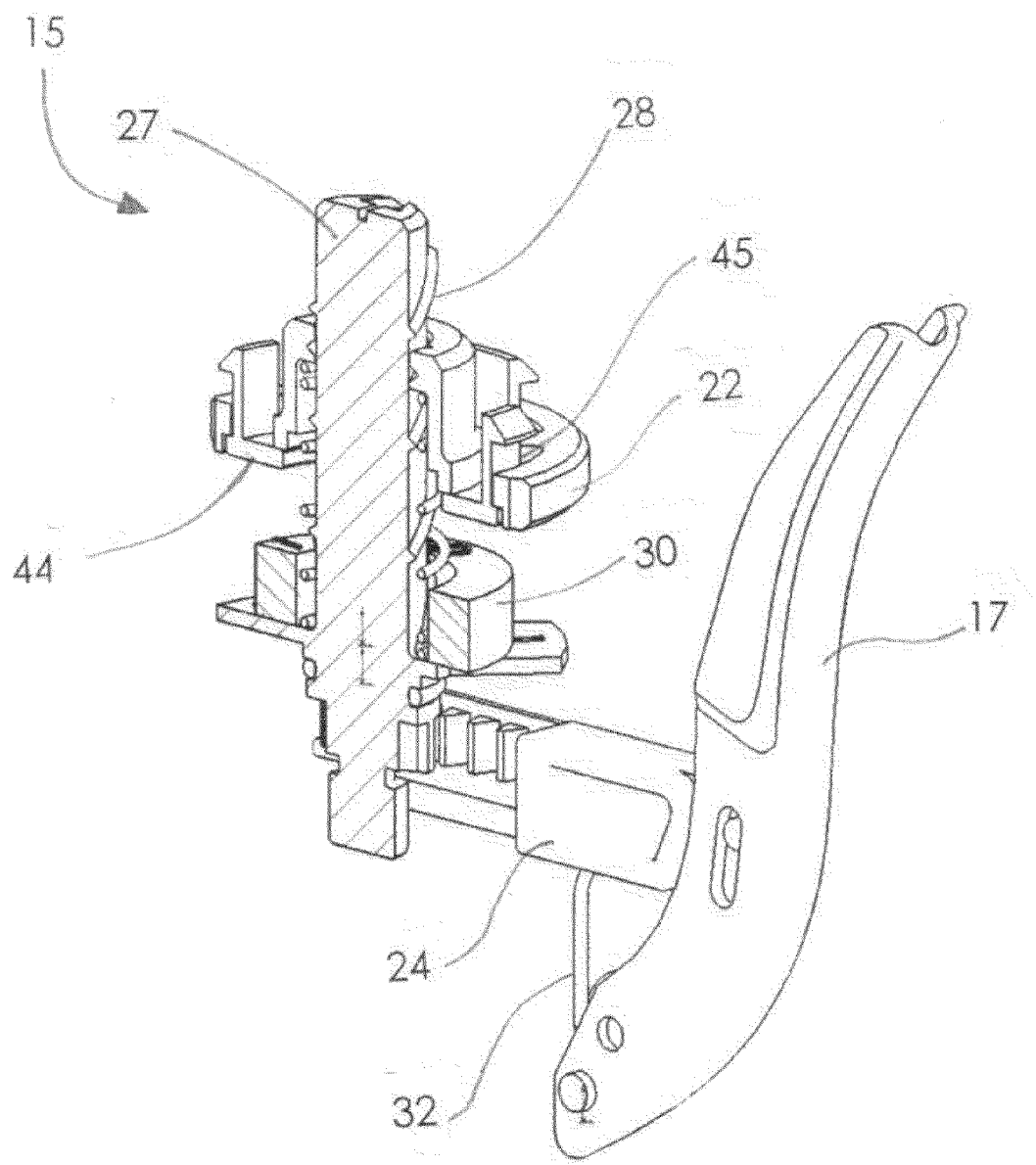
FIG. 6 is a partially sectioned cut-away view showing selected elements of the dispensing mechanism for the portion control dispenser.
Figure 7A:
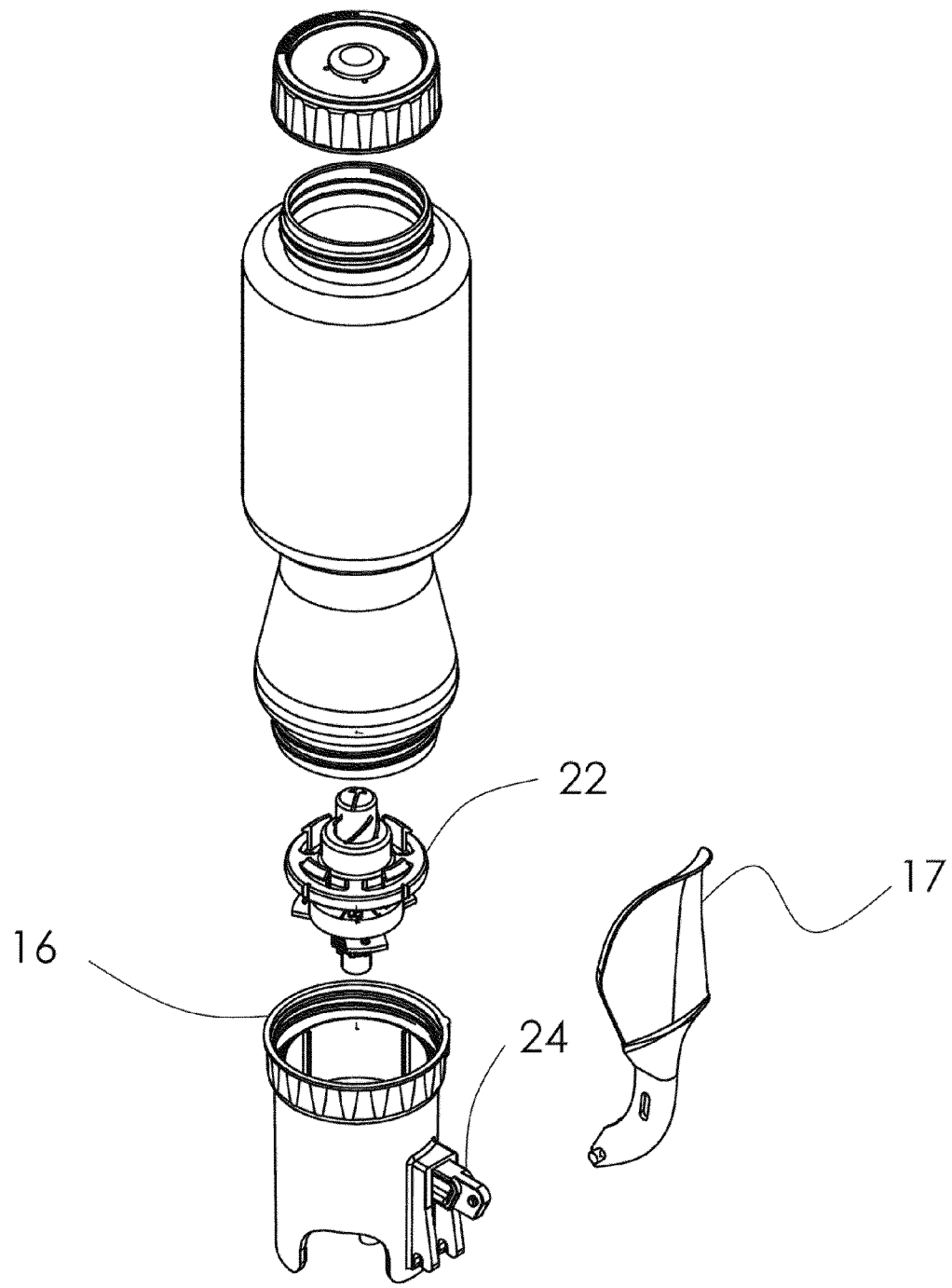
FIG. 7A is an exploded view of the portion control dispenser.
Figure 7B:
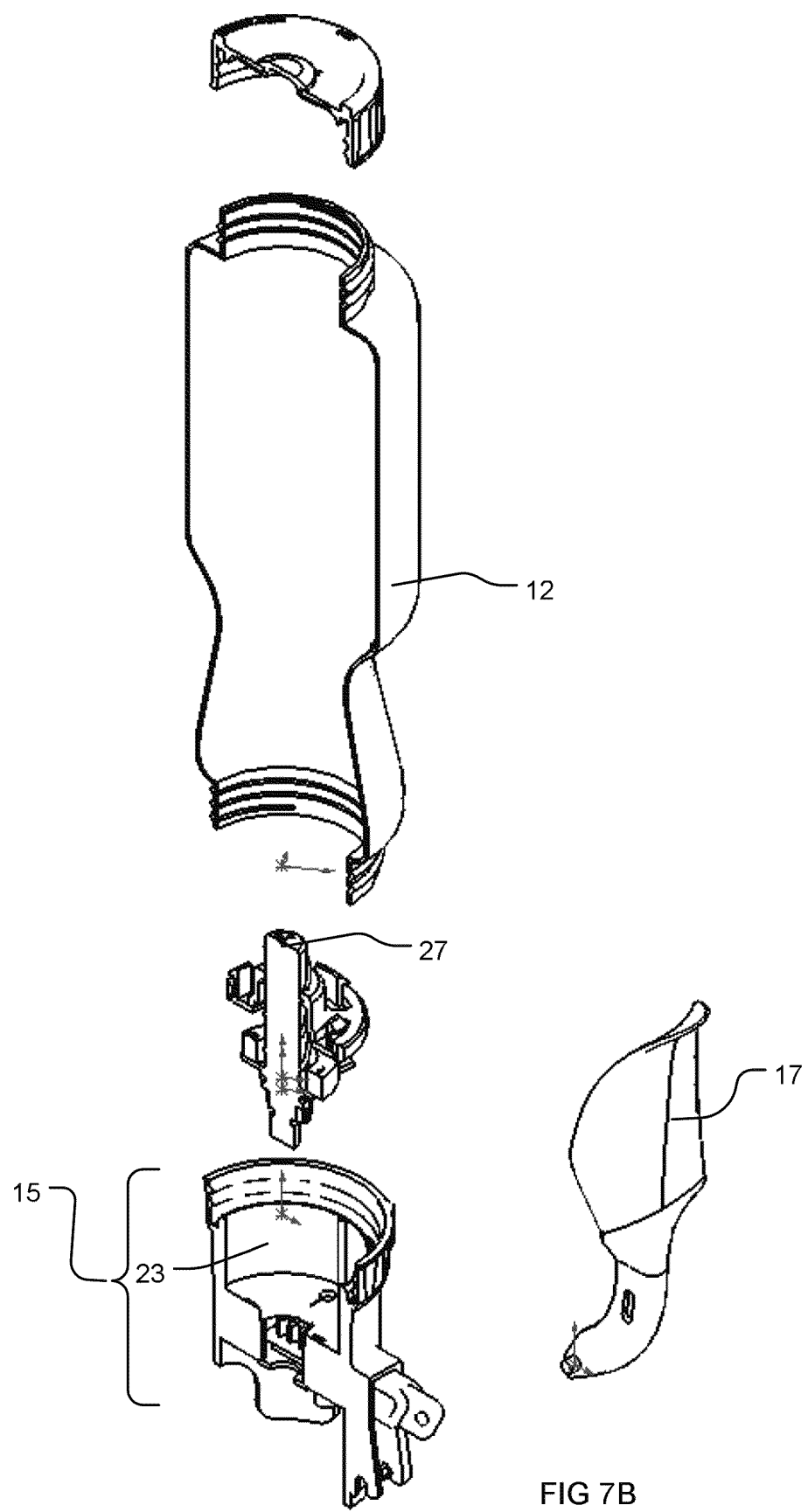
FIG. 7B is a cross-sectional exploded view of the portion control dispenser.

Member 44 can also be seen in FIG. 6 which shows a partial view of dispensing mechanism 15. It can be seen that in this embodiment member 44 comprises an annular member having resilient hooks projecting on its upper side. The resilient hooks project through openings 45 and hold member 44 in place. FIG. 4A shows spindle 27 with blades 37 and pinion 26B. As illustrated, an orientation marker 49 may be provided to assist in installing spindle 27 in the correct orientation.

All major components of portion control dispenser 10, with the possible exception of some springs may be made of suitable plastics. Where portion control dispenser 10 is to be used to dispense food products then all components that can contact the food products may be made from suitable food grade materials.

A large number of variations are possible in the implementation of portion control dispensers according to this invention. By way of illustration, some such variations are described below.

Although it is very convenient to provide a container or reservoir 12 holding material to be dispensed that mounts directly on dispensing mechanism 15, it would be possible to supply material to a separate dispensing mechanism 15 by way of a hose or the like from a remotely located supply of material. Additionally, although the container body 12 shown in the accompanying drawings has a removable cap 13 which may be removed to replenish the material within container body 12, this is not mandatory. In some embodiments, container body 12 may be removed from dispensing mechanism 15 to replenish the material within container body 12 or dispensing mechanism 15 will be applied in single use applications.

Figure 9A:
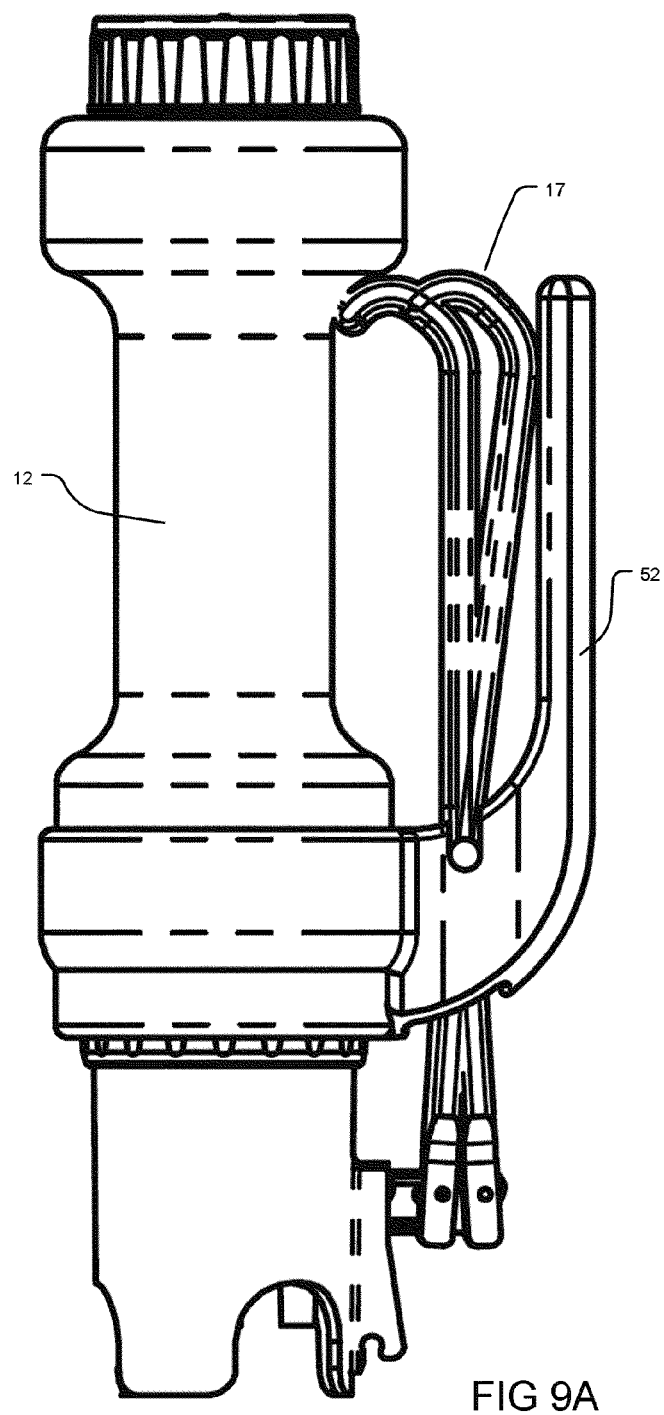
FIGS. 9A and 9B are schematic views showing some alternative configurations for operating handles.
Figure 9B:
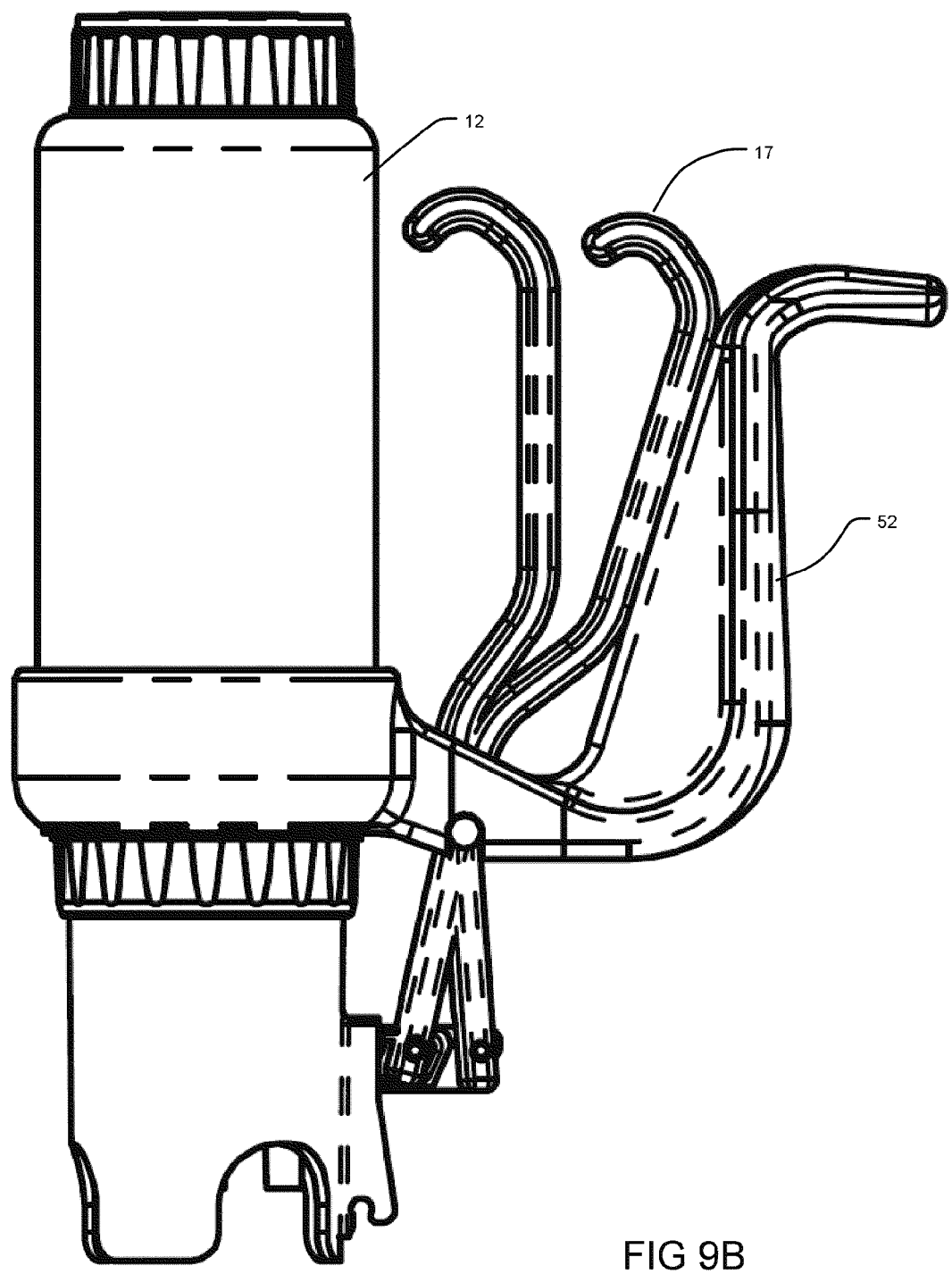

Handle 17 may take a wide variety of forms. For example, handle 17 may be elongated to allow a user to grip dispenser 10 farther up on container body 12 while operating dispenser 10. Handle 17 may have finger loops or other configurations to suitably engage a user's hand. Handle 17 may have a broad end portion to make it easier for people having hands of different sizes to comfortably operate dispenser 10. FIGS. 9A and 9B show dispensers having example alternative configurations for handle 17 and container body 12. In these embodiments, the dispenser can be operated by squeezing handle 17 toward a post 52.

Container body 12 may be cylindrical or may have a shape that makes dispenser 10 more comfortable to hold and operate. For example, container body 12 may have a smaller diameter portion in its portion near handle 17 to better accommodate users with small hands.

As an alternative to providing a one way valve in piston 22, for filling dispensing chamber 23 a one way valve could be provided in a passage that bypasses piston 22 and feeds fresh material to be dispensed directly into dispensing chamber 23 from the interior or container body 12.

It is not mandatory that ribs 39 be parallel to the axis of rotation of spindle 27. Ribs 39 could optionally be helical or otherwise inclined at an angle to the axis of spindle 27. In this case, the ribs 39 could be oriented so as to cause piston 22 to travel a longer or shorter distance for the same rotation of spindle 27.

In the illustrated embodiment, spindle 27 has male helical threads while the bore of piston 22 has female helical threads. This could be reversed. In the alternative, piston 22 could comprise projections of any suitable shape engaging corresponding helical grooves in spindle 27.

In the illustrated embodiment, spacer 30 limits the travel of piston 22. Other alternative mechanisms could be provided to limit the travel of piston 22. For example, one or more posts could be provided in substantially the same location as spacer 30, one or more projections projecting inwardly from the wall of dispensing chamber 23 could be placed to interfere with the travel of piston 22, a projection from spindle 27 could limit the travel of piston 22. For example, piston 22 may have a series of recesses into which pegs may be received. The travel of piston 22 in such embodiments could be adjusted by placing a peg in a recess such that the peg blocks travel of piston 22 past a desired point along spindle 27. Spacer 30 may be adjustable in thickness. For example, spacer 30 could comprise two components that can be screwed or otherwise moved together or apart to alter the thickness of spacer 30.

Alternative mechanisms may be provided for causing spindle 27 to rotate. For example, a rack and pinion is but one example of a linkage that converts reciprocating motion (of the rack) to rotary motion (of the pinion). Other suitable linkages that convert linear to rotary motion may also be used. For example, operation of handle 17 or another operating mechanism could pull a cable or other flexible member, thereby causing rotation of spindle 27. An electromechanical actuator such as a motor, electrically-powered linear actuator or pneumatic motor or actuator or the like could be provided to turn spindle 27 to dispense portions of material. Where a rack and pinion linkage is provided, the pinion may be coupled to drive rotation of spindle 27 by way of a gear train or other rotary motion transmission.

The number of ports 34 provided for material to exit chamber 23 may be more than three or fewer than three. In some embodiments a single port 34 delivering material to a single opening 18 may be adequate. Ports 34 may be made larger for dispensing granular materials or materials that do not flow easily.

Piston 22 and spindle 27 may be made so that piston 22 is captive on spindle 27. This may be done, for example, by providing a detent, ratchet or other mechanism that prevents piston 22 from being removed from the end of spindle 27. With this construction, spindle 27, piston 22 and spring may be pre-assembled so that they can be conveniently removed and installed as a unit. This facilitates initial assembly during manufacturing of a dispenser 10 as well as disassembly for cleaning dispenser 10 and subsequent reassembly.

In some embodiments, blades 37 are not provided. In some embodiments, alternative valves are provided between ports 34 and outlets 18. For example, suitable pressure-operated valves may be provided at or upstream from outlets 18 instead of or in addition to blades 37. The pressure operated valves may, for example comprise self-closing valves. For example, the pressure-operated valves may be of the type in which an elastomeric member is penetrated by slits that open in response to a pressure differential across the member and are self-closing after the pressure differential is removed.

Figure 8:
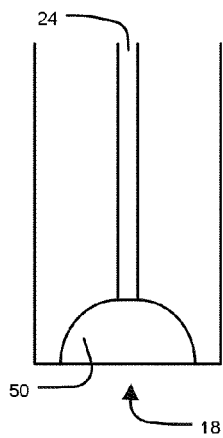
FIG. 8 is a cross section view of an end of a dispensing opening according to an example embodiment.

Openings 18 may optionally be shaped so as to reduce or eliminate the likelihood that drips will fall from openings 18 when dispenser 10 is not being operated or that material will dry out and plug openings 18. FIG. 8 shows an enlarged view of a portion of a possible embodiment wherein an opening 18 is divergent (opens to a larger diameter). In the illustrated embodiment, the end of opening 18 provides a hemispherical cavity 50. Other possible configurations for cavity 50 include flaring configurations and conical configurations.

In some such embodiments, container body 12 has one or more flexible walls that can collapse inwardly as flowable material is dispensed.

In some embodiments a dispenser may be intended for single use application, in which case, container body 12 need not be openable or removable from dispenser mechanism 15.

It can be understood from the above that a portion control dispenser may have various combinations of features. For example, a portion control dispenser may have an operating mechanism which includes a rotatable spindle cooperating with a piston such that rotation of the spindle moves the piston to dispense a quantity of material and also moves paddles or the like from a position in which exit ports are blocked to a position in which exit ports are open to allow the flow of material therethrough. In specific embodiments the spindle is rotated by a rack and pinion mechanism.

Another combination of features that a portion control dispenser may have is a piston that can be moved to cause material to be dispensed and a member which limits the travel of the piston to allow the amount of material dispensed to be adjusted. In some embodiments the member comprises a spacer. In some embodiments the spacer is an annular spacer. In some embodiments the piston is actuated by rotating a spindle that engages the piston.

Another combination of features that a portion control dispenser may have is a piston which is actuated to dispense material by way of a rotatable spindle which passes through the piston. The spindle carries helical features such as threads that engage the piston. In some embodiments the piston carries a one-way valve. The one-way valve may extend circumferentially around the piston.

The above-listed combinations of features are neither exhaustive nor limiting. A portion control dispenser may have any suitable combination or sub-combination of features described or depicted herein, including modified versions of such features.

It can be appreciated that certain embodiments offer various advantages over other dispensers. For example, some embodiments provide one or more of the following:
- single-handed operation;
- hand operated;
- easy to clean and keep clean;
- can be stored and operated in same orientation;
- can be set to repeatably deliver desired portions;
- robust, reliable mechanism;
- cost effective to manufacture.

While a number of exemplary aspects and embodiments have been discussed above, those of skill in the art will recognize certain modifications, permutations, additions and sub-combinations thereof. It is intended that the inventions described herein and the appended claims encompass all such modifications, permutations, additions and sub-combinations as are within their true spirit and scope.

What is claimed is:

1. A dispenser for dispensing flowable materials, the dispenser comprising:
   a reservoir in fluid communication with a dispensing chamber;
   a one-way valve in a path connecting the reservoir and the dispensing chamber, the one way valve oriented to permit flow of a flowable material from the reservoir into the dispensing chamber;
   a piston movably fitted in the dispensing chamber;
   at least one outlet port in the dispensing chamber; and
   a mechanism for advancing the piston along the dispensing chamber, the mechanism comprising:
     a spindle extending through an opening in the piston, the spindle having helical features engaged with features on the piston; and
     a handle operable to rotate the spindle;
   wherein the spindle is rotatable to advance the piston along the dispensing chamber in response to movement of the operating handle.

2. A dispenser according to claim 1 comprising a pinion rotatable with the spindle wherein the handle is coupled to the spindle by a linkage comprising a rack engaging the pinion.

3. A dispenser according to claim 1 wherein the handle is coupled to the spindle by a linkage configured to convert reciprocating motion of the handle to rotary motion of the spindle.

4. A dispenser according to claim 1 wherein the one-way valve is carried on the piston.

5. A dispenser according to claim 4 wherein the one-way valve comprises an annular valve member movable between a closed position wherein one or more apertures in the piston are substantially blocked by the valve member and an open position wherein the one or more apertures provide fluid communication between the reservoir and the dispensing chamber.

6. A dispenser according to claim 1 comprising a body defining the dispensing chamber wherein the reservoir is removably coupled to the body.

7. A dispenser according to claim 6 wherein the reservoir comprises a tubular vessel having openings at first and second ends thereof; a removable cap closing the opening at the first end and the second end removably coupled to the body.

8. A dispenser according to claim 7 comprising a one-way air inlet valve in the removable cap.

9. A dispenser according to claim 1 comprising a blade mounted for rotation with the spindle, the blade blocking the outlet port when the piston is in a retracted position and uncovering the outlet port upon rotation of the spindle to advance the piston.

10. A dispenser according to claim 1 comprising a plurality of outlet ports in the dispensing chamber and a plurality of blades mounted for rotation with the spindle, each of the blades blocking a corresponding one of the outlet ports when the piston is in a retracted position and uncovering the corresponding outlet port upon rotation of the spindle to advance the piston.

11. A dispenser according to claim 1 comprising a pressure-operated one way valve in the outlet port.

12. A dispenser according to claim 1 comprising a body defining the dispensing chamber wherein the operating handle is pivotally coupled to the body.

13. A dispenser according to claim 1 comprising a stop configurable to set a desired limit on travel of the piston.

14. A dispenser according to claim 13 wherein the stop comprises a ring and the spindle extends through the ring.

15. A dispenser according to claim 1 comprising a body defining the dispensing chamber and one or more feet extending downwardly from the body wherein the outlet port is in fluid communication with a dispensing nozzle recessed relative to the one or more feet.

16. A dispenser according to claim 1 wherein the outlet port is in fluid communication with a dispensing nozzle and the dispensing nozzle comprises diverging opening.

17. A dispenser according to claim 16 wherein the diverging opening comprises a hemispherical recess.

18. A dispenser according to claim 1 wherein the piston comprises a peripheral edge including one or more longitudinal grooves and the longitudinal grooves receive longitudinal ridges projecting from a wall of the dispensing chamber.

19. A dispenser according to claim 18 wherein the longitudinal ridges are inclined relative to an axis of rotation of the spindle.

20. A dispenser according to claim 1 comprising a bias mechanism connected to apply a torque to the spindle in a direction that tends to retract the piston.

* * * * *